UNITED STATES PATENT OFFICE 2,269,059

METHOD OF PREPARING FINELY COMMINUTED OXIDES

Dan McLachlan, Jr., Corning, N. Y., assignor to Corning Glass Works, Corning, N. Y., a corporation of New York No Drawing. Application May 14, 1938, Serial No. 208,056

14 Claims. (Cl. 23—140)

This invention relates to methods of preparing oxides and has for its primary object the preparation of finely comminuted oxides of high purity.

Another object is to prepare intimate mixtures of pure, finely comminuted oxides in predetermined proportions.

Still another object is to control the particle size of such oxides and mixtures.

The above and other objects may be accomplished by practicing my invention, which embodies among its features dissolving a hydrolyzable compound in a non-aqueous liquid medium comprising at least one liquid in which water is substantially insoluble, introducing a stoichiometric quantity of water into the solution slowly and with agitation and thereafter filtering the product.

Another feature comprises separately dissolving stoichiometric quantities of silicon tetrachloride and water in two equal volumes of solvent consisting each of equal parts of benzene and glacial acetic acid, adding the aqueous solution to the other slowly and with agitation and filtering the mixture.

Still another feature comprises dissolving a stoichiometric quantity of silicon tetrachloride in a definite volume of benzene, adding a stoichiometric quantity of frozen water, stirring until the water is completely decomposed and filtering the mixture.

A further feature comprises separately dissolving stoichiometric quantities of silicon tetrachloride and water in two equal volumes of solvent consisting each of equal parts of benzene and acetone, adding the aqueous solution to the other slowly and with agitation and filtering the mixture.

Other objects and features will become apparent as the description proceeds.

I have discovered that the hydrolysis of certain compounds which are easily hydrolyzed by water, such as silicon halides, ethyl silicate, titanium tetrachloride, aluminum chloride, zirconium chloride, methyl borate, etc., may be carried out in non-aqueous liquid media. I have also found that in such media when stoichiometric proportions are used, anhydrous oxides are formed which are extremely finely divided and that the fineness may be controlled by controlling the concentrations of the reacting substances, all other factors remaining constant.

Although my process is applicable to a variety of hydrolyzable compounds and mixtures thereof, the following description shows by way of example its application to silicon tetrachloride to form therefrom pure finely divided silica. In the hydrolysis of silicon tetrachloride one mole of the substance reacts with two moles of water, thus:

$$SiCl_4 + 2H_2O = SiO_2 + 4HCl$$

Therefore one gram molecular weight of silicon tetrachloride and two gram molecular weights of water are separately dissolved, each in 500 cc. of a non-aqueous liquid solvent consisting preferably of a mixture of benzene and glacial acetic acid in equal parts. The concentration of the solutions may be varied for the purpose of controlling the particle size of the silica, as will later appear. The solution containing the water is then poured slowly with stirring into the solution containing the silicon tetrachloride, whereupon the above stated reaction occurs and finely divided silica is precipitated. The amount of silicon tetrachloride is preferably made slightly in excess of theoretical so that all of the water will be decomposed, thereby insuring that the precipitated silica will be anhydrous. The precipitate is filtered off and air dried.

The filtrate consisting of the original solvent containing a trace of silicon tetrachloride may be used again for dissolving fresh quantities of the reacting substances and the process may thus be repeated in cycles. Since a portion of the filtrate, amounting to about 10%, remains on the filter it is necessary to add sufficient fresh solvent to compensate for this. Moreover, since a trace of silicon tetrachloride remains in the filtrate, it is desirable to decompose this by the addition of sufficient water dissolved in fresh solvent in the original proportions, in order to prevent appreciable change in concentration of reactants in succeeding cycles and to ensure uniformity of particle size. In the first cycle the solvents could have consisted of benzene alone for the silicon tetrachloride and glacial acetic acid alone for the water, but it will be seen that the filtrate from this cycle would consist of equal parts of benzene and acetic acid. Hence it is advantageous to employ this mixture for each cycle.

Some hydrolyzable compounds hydrolyze less readily than others. In the hydrolysis of weakly hydrolyzable compounds the secondary product of the reaction, such as the hydrogen chloride formed in the above mentioned equation, may tend to reverse the reaction. In order to facilitate the process and bring such an hydrolysis to completion, it may be desirable to eliminate the secondary product as by boiling off the hydrogen chloride during the reaction or by other suitable means.

Water is not appreciably soluble in benzene and, when it is added to the benzene-acetic acid mixture, it is dissolved by a major portion of the acetic acid thereby forming two phases, namely, benzene-acetic acid and water-acetic acid. With the above recited concentration, the one phase is dispersed throughout the other with no visible separation, but, nevertheless, the water is considered as in a separate phase though the individual increments thereof consist of aggregrates of only a few molecules. With sufficiently large concentrations of water the globules of the water-acetic acid phase are large enough to form a visible emulsion or suspension which separates into two distinct layers on standing. In view of these facts and for convenience, both the water and the hydrolyzable compound are referred to herein as being dissolved and forming solutions although it is understood that the water dissolves only in the liquid in which it is soluble, and that theoretically at least such solution forms a suspension or emulsion in the non-solvent.

In lieu of the above recited solvents, I may use a mixture of equal parts of benzene and acetone in the same manner as set forth above for benzene and glacial acetic acid. I may also use acetone alone, or glacial acetic acid alone, as the solvent for both the silicon tetrachloride and the water. When acetone alone or in combination is used as a solvent, the hydrogen chloride formed during the reaction tends to cause its polymerization; hence solvents containing acetone are not as desirable as the combination of benzene and glacial acetic acid. When the same solvent is used for both reactants, as glacial acetic acid alone or acetone alone, only small sized particles can be produced, as will be shown. Other solvents and combinations of solvents for various hydrolyzable salts or compounds will be conceivable to one who is skilled in the art, the concentrations in each case being preferably one gram equivalent of the reacting substance per 500 cc. of the solvent as set forth above.

As an alternative to the above described method and in case it is desired to conserve solvent, the silicon tetrachloride may be dissolved in benzene alone in the stated proportions of one gram equivalent per 500 cc. and a gram equivalent of frozen water or ice may be added directly to the solution. The reaction occurs at the surface of the ice without undue violence.

The particle size of the precipitated oxide may be controlled to some extent, subject to the following considerations. Other factors remaining constant, the particle size is directly proportional to the concentration of the reactants. Theoretically, collisions occur between the formed molecules of the oxide and if such collisions occur while the molecules are fresh, that is, before they have lost their activation energy, coalescence will take place and aggregates will be formed. The more frequent such collisions and coalescence can be made the larger the aggregate or particles will become. Obviously any change in conditions which will increase the local concentration of the freshly formed oxide molecules will cause increase in the particle size. The local concentration may be increased in three ways: (1) by employing a medium comprising at least one liquid in which water is substantially insoluble, (2) by increasing the concentration of either or both reactants in their respective media, and (3) by adding the water to the compound to be hydrolyzed.

Considering the conditions obtaining in the method set forth in detail above, the silicon tetrachloride is soluble in both benzene and acetic acid and the molecules thereof migrate easily throughout the entire volume of the mixed solvents. The water, however, is soluble only in the acetic acid and hence is confined to one phase, namely, acetic acid and water. Its molecules, therefore, are restrained from becoming widely dispersed through the volume. Consequently, when the two solutions are mixed and reaction occurs between the molecules of the reactants, the local concentrations of freshly formed silica molecules is relatively high and may be made still higher by increasing the concentration of either or both the silicon tetrachloride or the water in their respective solvents or, in other words, by decreasing the volume of the solvent employed in dissolving them. This results in an increase in particle size. Conversely by lowering the concentration of the reactants the particle size may be made smaller. The above recited preferred concentration of one gram equivalent per 500 cc. will produce particles that may readily be filtered off. In varying the concentrations of the reactants it is preferable to vary both at once in the same proportions because better uniformity of particle size is thereby obtained.

The control of particle size by varying the concentration of the reactants requires that other factors, such as the rate of mixing of the solutions, temperature, etc., remain as nearly constant as possible. Increasing the rate of mixing should cause increased local concentration of reactive silica molecules and hence increased particle size. However, an increase in the rate of mixing causes an increase in the rate of evolution of heat due to the reaction and with too rapid mixing the solutions will boil and effervesce violently if the concentrations are relatively high. The extent to which the reactants may be concentrated in their respective solvents for the purpose of increasing particle size is likewise limited by the almost explosive violence with which excessively concentrated solutions react when mixed and the enormous amount of heat that is liberated. It is therefore preferable, as pointed out above, to pour the solutions together slowly and at the same time to stir the mixture rapidly and uniformly.

In case a universal solvent is used, that is, one which will dissolve both reactants, such as glacial acetic acid alone or acetone alone as mentioned above, the product is limited to relatively small sized particles, because in this instance the molecules of both reactants become equally dispersed throughout the volume of the mixture and the local concentration of reactive oxide molecules can never become very high. It is therefore preferable to employ at least one solvent which will not dissolve both reactants.

In case the water is added directly in the form of ice to a solution of silicon tetrachloride in benzene, the particle size of the precipitated silica will vary somewhat and an appreciable amount thereof will be non-filtrable. Although in this instance one of the reactants, namely, water, is highly concentrated, which condition as shown above is conducive to the formation of large particles, it is believed that the formation of a film of silica on the surface of the ice slows the reaction and this increasingly diminishes the frequency of aggregation of the silica molecules. When the film attains a ponderable thickness, it is removed by the stirring and the freshly exposed surface of the ice again promotes the formation of larger particles.

For some purposes such as the production of special glass or refractory compositions, it is advantageous to coprecipitate two or more oxides by hydrolyzing at the same time and in the same mixture of solutions two or more hydrolyzable salts or compounds. In such cases a fractional part of a gram equivalent of each of the compounds chosen, totaling in all one gram equivalent according to their various reactions, are dissolved in 500 cc. of a suitable non-aqueous solvent and the solution is mixed with the equivalent amount of water dissolved separately as set forth above for the preparation of silica. Obviously, since the particle size depends primarily on the concentration of the reactants, the individual oxides of a mixture prepared in this manner may not possess the same particle size. The proportions of the compounds to be used are readily calculated from the ratios of their respective oxides in the desired composition. For example, if it is desired to produce a composition comprising 95 mol % $SiO_2$ and 5 mol % $Al_2O_3$ the reactions will be:

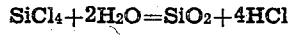
$$SiCl_4 + 2H_2O = SiO_2 + 4HCl$$

$$2AlCl_3 + 3H_2O = Al_2O_3 + 6HCl$$

Therefore, 95% of one gram molecular weight or 161.5 grams of silicon tetrachloride and 5% of two gram molecular weights or 13.4 grams of aluminum chloride are dissolved in preferably 500 cc. of a suitable non-aqueous solvent, such as benzene and glacial acetic acid in equal parts. In like manner 95% of two gram molecular weights of water and 5% of three gram molecular weights of water or a total of 37 grams are dissolved in 500 cc. of the benzene-acetic acid solvent and the two solutions are mixed and filtered in the manner described above. The resulting product will consist of the two oxides in the desired proportions and in the most intimate possible mixture. Many compositions of various oxides may be prepared in a similar manner by my process provided hydrolyzable salts or compounds of the respective elements are available which can be thus hydrolyzed with water in non-aqueous liquid media.

I claim:

1. The method of preparing finely comminuted silica, which includes dissolving a definite quantity of silicon halide in a definite volume of benzene, the concentration being not less than about one gram molecular weight of the halide per 500 cc. of solvent, adding a quantity of frozen water which is substantially the stoichiometric amount necessary to convert the halide to the oxide, stirring until the water is completely decomposed and separating the silica by filtration.

2. The method of preparing finely comminuted silica, which includes dissolving a definite quantity of silicon tetrachloride in a definite volume of benzene, the concentration being not less than about one gram molecular weight of silicon-tetrachloride per 500 cc. of solvent, adding a quantity of frozen water which is substantially the stoichiometric amount necessary to convert the silicon tetrachloride to oxide, stirring until the water is completely decomposed and separating the silica by filtration.

3. The method of preparing finely comminuted silica, which includes dissolving silicon tetrachloride in benzene in the proportions of one gram molecular weight of solute per 500 cc. of solvent, adding two gram molecular weights of frozen water, stirring until the water is completely decomposed and separating the silica by filtration.

4. The method of preparing a mixture of finely comminuted oxides, which includes dissolving a mixture of at least two hydrolyzable compounds in a definite volume of a non-aqueous liquid medium, the amount of each compound per 500 cc. of solvent being a fraction of a gram-equivalent based on its reaction with water, the sum of the fractions being equal to one, separately dissolving a stoichiometrically equivalent amount of water in an equal volume of a non-aqueous liquid medium, the media comprising at least one liquid in which water is substantially insoluble, mixing the solutions by adding the water solution to the solution of the compounds and filtering the mixed solutions.

5. The method of preparing finely divided oxides which includes dissolving a hydrolyzable compound in a non-aqueous liquid medium comprising at least one liquid in which water is substantially insoluble, the concentration of the compound per 500 cc. of solvent being not less than the equivalent of one mol of the oxide, introducing into the solution slowly and with agitation an amount of water which is substantially the stoichiometric quantity necessary to convert the compound to the oxide, the concentration of the water being not less than that of the compound, and thereafter separating the oxide by filtration.

6. The method of preparing finely divided oxides which includes dissolving a hydrolyzable compound in a definite volume of a non-aqueous liquid mixture comprising a liquid in which water is substantially insoluble and a liquid in which water is soluble, the concentration of the compound per 500 cc. of solvent being not less than the equivalent of one mol of the oxide, dissolving separately in a like volume of the same liquid mixture an amount of water which is substantially the stoichiometric quantity necessary to convert the compound to the oxide, adding the water-containing solution to the solution of the compound slowly and with agitation and separating the oxide by filtration.

7. The method of preparing finely divided silica which includes dissolving a hydrolyzable compound of silicon in a non-aqueous liquid medium comprising at least one liquid in which water is substantially insoluble, the concentration of the compound per 500 cc. of solvent being not less than the equivalent of one mol of silica, introducing into the solution slowly and with agitation an amount of water which is substantially the stoichiometric quantity necessary to convert the compound to the oxide, the concentration of the water being not less than that of the compound, and thereafter separating the silica by filtration.

8. The method of preparing finely divided silica which includes dissolving a silicon halide in a definite volume of a non-aqueous liquid mixture comprising a liquid in which water is insoluble and a liquid in which water is soluble, the concentration of the halide per 500 cc. of solvent being not less than one gram molecular weight, dissolving separately in a like volume of the same liquid mixture an amount of water which is substantially the stoichiometric quantity necessary to convert the halide to the oxide, adding the water-containing solution to the solution of the silicon halide slowly and with agitation and separating the silica by filtration.

9. The method of preparing finely divided silica which includes dissolving a definite quantity of silicon tetrachloride in a mixture of benzene and glacial acetic acid, the concentration of the silicon-tetrachloride per 500 cc. of solvent being not less than one gram molecular weight, dissolving separately in a like volume of the same mixture an amount of water which is substantially the stoichiometric quantity necessary to convert the tetrachloride to the oxide, adding the water-containing solution to the solution of the silicon tetrachloride slowly and with agitation and separating the silica by filtration.

10. The method of preparing finely divided silica which includes dissolving silicon tetrachloride in a mixture of equal parts of benzene and glacial acetic acid in the proportions of one gram molecular weight of solute per 500 cc. of solvent, dissolving water in a similar mixture in the proportions of two gram molecular weights of solute per 500 cc. of solvent, adding the water-containing solution to the solution of silicon tetrachloride slowly and with agitation and separating the silica by filtration.

11. The method of preparing finely divided silica which includes dissolving a silicon halide in a definite volume of a mixture of benzene and acetone, the concentration of the halide per 500 cc. of solvent being not less than one gram molecular weight, dissolving in a like volume of the same mixture separately an amount of water which is substantially the stoichiometric quantity necessary to convert the halide to the oxide, adding the water-containing solution to the solution of the silicon halide slowly and with agitation and separating the silica by filtration.

12. The method of preparing finely divided silica which includes dissolving silicon tetrachloride in a mixture of equal parts of benzene and acetone in the proportions of one gram molecular weight of solute per 500 cc. of solvent, dissolving water in a similar mixture in the proportions of two gram molecular weights of water per 500 cc. of the mixture, adding the water-containing solution to the solution of silicon chloride slowly and with agitation and separating the silica by filtration.

13. The method of preparing a mixture of finely divided oxides in definite percentages which includes dissolving a plurality of hydrolyzable compounds, in proportions equivalent to the desired percentages of oxides, in one volume of a non-aqueous liquid medium comprising at least one liquid in which water is substantially insoluble, the concentration of each compound per 500 cc. of solvent being not less than the amount which, when reacted with water, will produce the desired percentage of one mol of the corresponding oxide, introducing into the solution slowly and with agitation an amount of water which is substantially the stoichiometric quantity necessary to convert the compounds to oxides, the concentration of the water being not less than that of the compounds, and thereafter separating the oxides by filtration.

14. The method of preparing a mixture of finely divided oxides in definite percentages, which includes dissolving a plurality of hydrolyzable compounds, in proportions equivalent to the desired percentages of oxides, in one volume of a non-aqueous liquid mixture comprising a liquid in which water is substantially insoluble and a liquid in which water is soluble, the concentration of each compound per 500 cc. of solvent being not less than the amount which, when reacted with water, will produce the desired percentage of one mol of the corresponding oxide, dissolving separately in a like volume of the same liquid mixture an amount of water which is substantially the stoichiometric quantity necessary to convert the compounds to oxides, adding the water-containing solution to the solution of the compounds slowly and with agitation and separating the oxides by filtration.

DAN McLACHLAN, Jr.